United States Patent
Hawtof et al.

(10) Patent No.: US 11,934,351 B2
(45) Date of Patent: Mar. 19, 2024

(54) LOSSLESS CONVERSION OF EXPRESSIVE METADATA

(71) Applicant: Salesforce, Inc., San Francisco, CA (US)

(72) Inventors: Zachary Hawtof, San Francisco, CA (US); Kartik Saxena, San Francisco, CA (US); Eirik Skogstad, San Francisco, CA (US)

(73) Assignee: Salesforce, Inc., San Francisco, CA (US)

(*) Notice: Subject to any disclaimer, the term of this patent is extended or adjusted under 35 U.S.C. 154(b) by 0 days.

(21) Appl. No.: 16/778,081

(22) Filed: Jan. 31, 2020

(65) Prior Publication Data

US 2021/0240665 A1  Aug. 5, 2021

(51) Int. Cl.
| | |
|---|---|
| *G06F 16/14* | (2019.01) |
| *G06F 16/11* | (2019.01) |
| *G06F 16/901* | (2019.01) |
| *G06F 16/908* | (2019.01) |

(52) U.S. Cl.
CPC .......... *G06F 16/156* (2019.01); *G06F 16/116* (2019.01); *G06F 16/122* (2019.01); *G06F 16/901* (2019.01); *G06F 16/908* (2019.01)

(58) Field of Classification Search
CPC .... G06F 16/156; G06F 16/122; G06F 16/901; G06F 16/908; G06F 16/116
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |

(Continued)

*Primary Examiner* — Pierre M Vital
*Assistant Examiner* — Zuheir A Mheir
(74) *Attorney, Agent, or Firm* — Lorenz & Kopf, LLP

(57) ABSTRACT

A method and system for expressive conversion of more expressive metadata to less expressive metadata while maintaining lossless conversion including receiving a request for a second system metadata, retrieving a first system metadata, generating the second system metadata in response to the request for the second system metadata and the first system metadata wherein the second system metadata includes a first subset of the first system metadata, generating a site metadata mapping in response to the second system metadata and the first system metadata wherein the site metadata mapping includes a second subset of the first system metadata not included in the second subset of the first system metadata, storing the site metadata mapping in a memory, and transmitting the second system metadata to a client application.

12 Claims, 5 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,269,578 B2 * | 9/2007 | Sweeney ............... G06Q 20/383 |
| | | 705/64 |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,271,548 B2 * | 9/2012 | Prahlad ............... G06F 16/2228 |
| | | 707/812 |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,738,620 B2 * | 5/2014 | Lee ....................... G06Q 10/10 |
| | | 707/736 |
| 8,990,213 B1 * | 3/2015 | Yalamanchi ....... G06Q 30/0601 |
| | | 707/740 |
| 9,665,885 B1 * | 5/2017 | Allouche ........... G06Q 30/0244 |
| 9,690,795 B1 * | 6/2017 | McGrath ................ G06F 16/14 |
| 9,965,543 B1 * | 5/2018 | Ross ..................... G06F 16/148 |
| 10,713,272 B1 * | 7/2020 | Caldwell ................ G06F 16/27 |
| 10,949,568 B1 * | 3/2021 | Peake, III ........... G06F 21/6254 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050573 A1 | 3/2005 | Exley et al. |
| 2005/0091098 A1 | 4/2005 | Brodersen et al. |
| 2006/0021019 A1 | 1/2006 | Hinton et al. |
| 2006/0179061 A1 * | 8/2006 | D'Souza ................ G06F 16/283 |
| 2007/0156696 A1 * | 7/2007 | Lim ........................ G06F 16/93 |
| 2007/0225966 A1 * | 9/2007 | Suen ..................... G06F 9/454 |
| | | 704/9 |
| 2008/0059474 A1 * | 3/2008 | Lim ..................... G06F 21/316 |
| 2008/0249972 A1 | 10/2008 | Dillon |
| 2008/0270451 A1 * | 10/2008 | Thomsen ............. G06F 16/355 |
| 2009/0063114 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah et al. |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |

(56) References Cited

U.S. PATENT DOCUMENTS

| | | | |
|---|---|---|---|
| 2015/0161693 A1* | 6/2015 | Yalamanchi | G06F 12/0646 |
| | | | 705/26.1 |
| 2015/0332289 A1* | 11/2015 | Arroyo | G06Q 50/01 |
| | | | 705/7.29 |
| 2016/0026438 A1* | 1/2016 | Wolfram | G06F 9/445 |
| | | | 717/109 |
| 2017/0223003 A1* | 8/2017 | Miles | G06F 21/6254 |
| 2018/0081976 A1* | 3/2018 | Dejuan | G06F 16/958 |
| 2018/0103084 A1* | 4/2018 | Auvenshine | G06F 16/2246 |
| 2018/0225177 A1* | 8/2018 | Bhagi | G06F 11/1448 |
| 2019/0243865 A1* | 8/2019 | Rausch | H04L 67/1095 |

* cited by examiner

200

LOSSLESS CONVERSION OF EXPRESSIVE METADATA

TECHNICAL FIELD

Embodiments of the subject matter described herein relate generally to database operations. More particularly, embodiments of the subject matter relate to expressive conversion of more expressive metadata to less expressive metadata while maintaining lossless conversion.

BACKGROUND

In operations of a database, data is continually updated by different entities with differing levels of data access and data exposure. Websites and applications can have multiple metadata format representations. As these site metadata formats evolve they may no longer maintain one-to-one relationships of their field data. Therefore, it is difficult to maintain a lossless catalog of data when converting between two metadata formats. Accordingly, it is desirable to provide a method of expressive conversion of more expressive metadata to less expressive metadata while maintaining lossless conversion. Furthermore, other desirable features and characteristics will become apparent from the subsequent detailed description and the appended claims, taken in conjunction with the accompanying drawings and the foregoing technical field and background.

SUMMARY

Disclosed herein are metadata provision, control, and conversion methods and systems and related control logic for provisioning data management servers for executing data management algorithms. By way of example, and not limitation, there is presented various embodiments of an expressive conversion of more expressive metadata to less expressive metadata while maintaining lossless conversion are disclosed herein.

In accordance with an aspect of the present invention, an apparatus comprising a first memory configured for storing a first system metadata, a processor for receiving a request for a second system metadata wherein the second system metadata is a subset of the first system metadata, for generating the second system metadata in response to the first system metadata and for generating a site metadata mapping in response to the first system metadata wherein the site metadata mapping includes data from the first system metadata not included in the second system metadata, a network interface for transmitting the second system metadata to a client application, and a memory configured for storing the site metadata mapping.

In accordance with another aspect of the present invention, a method for receiving a request for a second system metadata, retrieving a first system metadata, generating the second system metadata in response to the request for the second system metadata and the first system metadata wherein the second system metadata includes a first subset of the first system metadata, generating a site metadata mapping in response to the second system metadata and the first system metadata wherein the site metadata mapping includes a second subset of the first system metadata not included in the second subset of the first system metadata, storing the site metadata mapping in a memory, and transmitting the second system metadata to a client application.

In accordance with another aspect of the present invention, a method for receiving a request for a less expressive system metadata, generating the less expressive system metadata in response to a more expressive system metadata, generating a site metadata mapping in response to a subset of the more expressive metadata not included in the less expressive system metadata, receiving an updated less expressive system metadata, generating an updated more expressive system metadata in response to the updated less expressive system metadata and the site metadata mapping, and executing a data management algorithm in response to the updated more expressive system metadata.

The above advantage and other advantages and features of the present disclosure will be apparent from the following detailed description of the preferred embodiments when taken in connection with the accompanying drawings.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A method and system are disclosed for expressive conversion of more expressive metadata to less expressive metadata while maintaining lossless conversion. The method and apparatus are operative to facilitate lossless conversion when converting site metadata formats using intermediary interfaces to convert expressive metadata to less expressive metadata while maintaining lossless conversion. In one exemplary embodiment, the metadata not transposed into the less expressive format is stored in a site metadata mapping set of files to be maintained for when the conversion back is necessary. When converting from a more expressive site metadata format to a less expressive site metadata format, the site metadata mapping is generated to maintain lossless knowledge. Developers may then update the less expressive metadata with new attributes and objects. When the updated less expressive metadata is required to be converted back to more expressive metadata, the less expressive metadata may be recombined with the site metadata set of files to ensure a lossless conversion. In this example, the updated expressive metadata now contains new objects and attributes which were present in the less expressive metadata. The site metadata set of files is operative to capture necessary the static files from the more expressive metadata needed for the less expressive site metadata format to properly scaffold and operate. This advantageously facilitates a local development experience or a continuous integration server to use the converted format with no additional steps.

Figure 1:
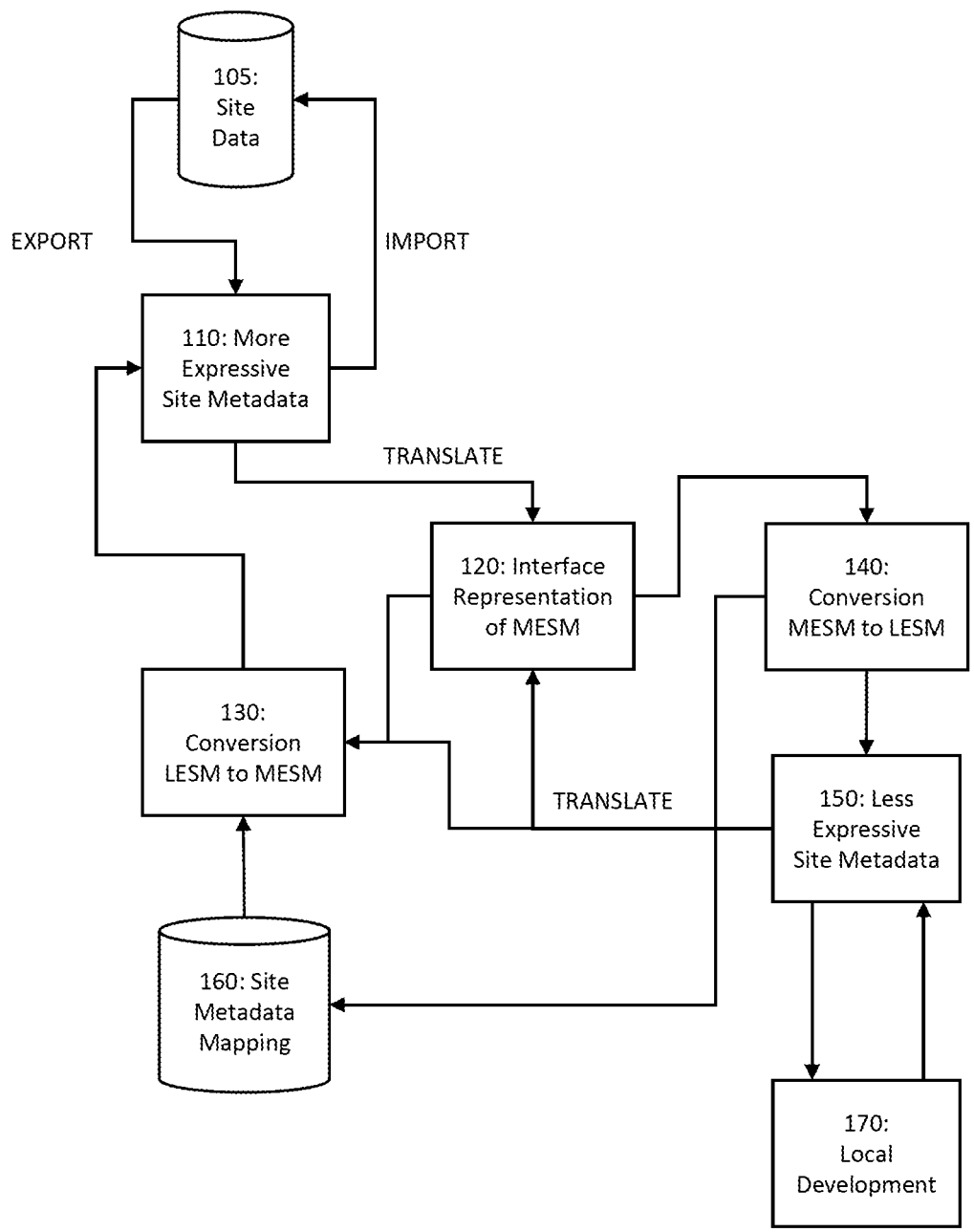
FIG. 1 shows an exemplary relationship diagram for expressive conversion of more expressive metadata to less expressive metadata while maintaining lossless conversion according to an exemplary embodiment of the present disclosure.

Turning now to FIG. 1, an exemplary relationship diagram 100 for expressive conversion of more expressive metadata to less expressive metadata while maintaining lossless conversion is shown. The exemplary relationship diagram 100 shows a site data 105, more expressive site metadata (MESM) 110, an interface representation of MESM 120, less expressive site metadata (LESM) 150, conversion from LESM to MESM 130, conversion from MESM to LESM 140, site metadata mapping 160 and local development 170.

In this exemplary embodiment, the site data 105 is operative to provide metadata for a cloud computing application. For example, a customer relationship management (CRM) application may receive customer data related to a customer history, such as sales, inventory, and interactions, to perform data analysis on the customer data to improve customer organization and relationships in order to increase customer retention and drive sales growth. The site data 105 may include data that is received from the client, some data that is generated in response to the data received from the client and cloud-based algorithms that are not provided to the client, and results data that are available to the client. Data available to the client may be provided via a web based application or a client side software application in communication with the cloud based server via a local area network or via the internet.

The MESM 110 is a set of metadata which includes metadata not included in the LESM. For example, the MESM 110 may include proprietary data resulting from a cloud based algorithm, such as intermediate data, data flags, relationship markers and the like, which are not provided to a CRM client. The MESM 110 may also include data which is received from the CRM client, such as customer contact data, and data which is provided to the CRM client, such as customer communication reminder dates.

The local development 170 may be a client-side application operative to provide and receive LESM 150 and to perform remote algorithms on a client-side platform. For example, an inventory management application may be used at a client site to update inventory in response to inflow and outflow of inventory. The local development 170 may further include client developed applications.

The LESM 150 may be a subset of the MESM 110 and may include data that is provided to the local development 170, such as a client application. The LESM 150 may be updated by a client in a remote application separate from the cloud based algorithm resulting in LESM 150 which is different from data stored in the corresponding MESM 110 field. For example, an LESM 150 may be used for inventory tracking where periodically the resulting inventory LESM 150 may be used to update related MESM 110 fields.

The exemplary relationship may further include an interface representation of MESM 120. The interface representation of the MESM 120 is operative to receive a translation of an MESM or LESM to an intermediate format in order to facilitate an extraction of the objects the MESM or LESM. The intermediate format of the objects of the MESM or LESM are then passed to the metadata converters where it is used in the conversion of the respective LESM or MESM.

The exemplary relationship 100 further includes a conversion from MESM to LESM 140. The MESM may be received via the interface representation of the MESM 120 and converted to an LESM. When converting from a MESM format to a LESM format, a site metadata mapping 160 is generated to maintain lossless knowledge. This facilitates a developer team or the like to update the LESM with new attributes and objects without access to the MESM. In an exemplary embodiment, a subset of the MESM is converted to LESM by a metadata converter. The remaining MESM that is not part of the subset of MESM used to generate the LESM is then stored in a site metadata mapping 160. The LESM may then be provided to the local development 170, or a CI system for publishing, or the like.

The site metadata mapping 160 is a repository for MESM data not provided to the local development 170 with the LESM. In one exemplary embodiment, this data retains structure and/or field information relate to the MESM may be stored in a cloud-based application, remote server or the like. The site mapping 160 data is used to facilitate a lossless conversion from MESM to LESM and back to MESM.

The conversion from LESM to MESM 130 is operative to receive LESM from the local development 170. The conversion from LESM to MESM 130 is then further operative to receive corresponding data from the site metadata mapping 160 and to combine the LESM and the corresponding data to restore the MESM. The restored MESM is then provided to the site data 105.

Figure 2:
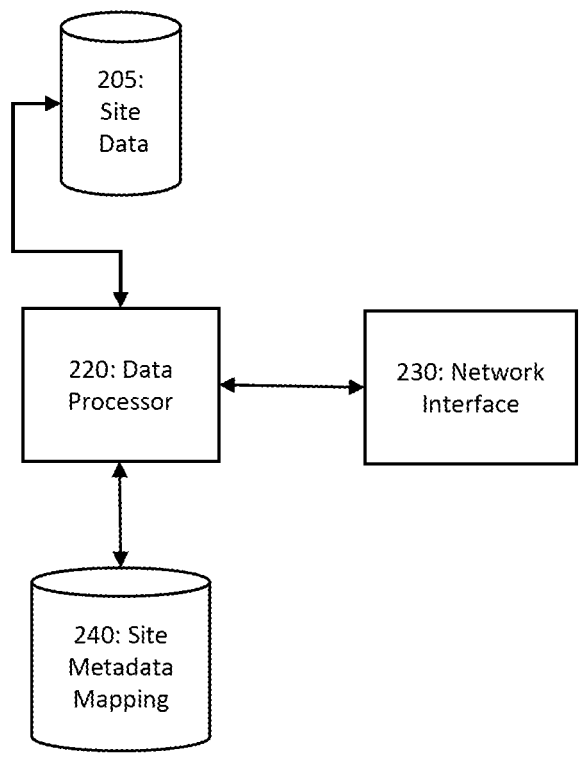
FIG. 2 is block diagram of an exemplary system for expressive conversion of more expressive metadata to less expressive metadata while maintaining lossless conversion according to an exemplary embodiment of the present disclosure.

Turning now to FIG. 2, a block diagram of an exemplary system 200 for expressive conversion of more expressive metadata to less expressive metadata while maintaining lossless conversion is shown. The exemplary system includes a site data memory 205, a data processor 220, a network interface 230 and a site mapping data memory 240. In an exemplary embodiment, the data processor 220 is operative to receive data from a client or a remote user via the network interface 230. The data processor 220 is then operative to perform an algorithm in response to the received data and a data stored in the site data memory 205. The data processor 220 may then be further operative to transmit data representative of the results of the algorithm to the client or remote user via the network interface 230.

In an exemplary embodiment, the site data memory 205 may be operative to store a MESM. The MESM may be used for input data to the algorithm, such as a cloud-based CRM algorithm, wherein the resulting data is made available to a client. In addition, the data processor 220 may be operative to receive a request for LESM from a client application via the network interface 230 or may be operative to receive a request for LESM from an associated algorithm or the like. The request may be indicative of a subset of the MESM. The data processor 220 may then be operative to receive the MESM from the site data memory 205 and to perform the MESM to LESM conversion. The MESM to LESM conversion may include generating an LESM in response to a first subset of the MESM. The first subset may be determined in response to request for the LESM and in response to system restrictions, rules and protocols. The data processor 220 may further be operative to generate a site metadata mapping wherein the site metadata mapping may include a second subset of the MESM wherein the second subset includes metadata not included in the first subset. The data processor 220 may then couple the LESM to the network interface 230 for transmission to a client. The data processor 220 may then couple the site metadata mapping to the site metadata mapping memory 240 for storage in anticipation of a LESM to MESM conversion request.

In an additional aspect of the exemplary embodiment, the data processor 220 may perform an operation to reconvert the LESM into the MESM. The reconversion may be performed in response to a request via a client and may be initiated in response to receiving an LESM from the client. The LESM may be received via the network interface 230 or other communications channel, such as a computer data bus. In response to the request and the LESM, the data processor 220 may retrieve a site data mapping from the site data mapping memory 240 corresponding to the LESM. The data processor 220 may then be operative to generate the MESM in response to the LESM and the site metadata mapping. The data processor 220 may then be operative to couple the MESM to the site data memory 205 for storage and used to perform the algorithm, such as the cloud-based CRM algorithm.

Figure 3:
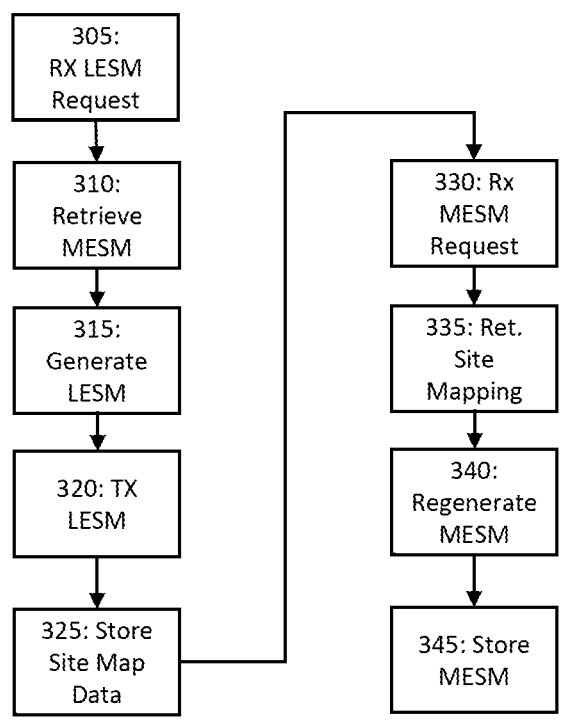
FIG. 3 is a flowchart of a method for expressive conversion of more expressive metadata to less expressive metadata while maintaining lossless conversion according to an exemplary embodiment of the present disclosure.

Turning now to FIG. 3, a flowchart 300 is shown of a method for expressive conversion of more expressive metadata to less expressive metadata while maintaining lossless conversion. The method is first operative to receive 305 a request for LESM. The request may be received via a client application performing an associated algorithm or the like. The request may be received via a network interface or may be generated by an algorithm associated with a cloud-based application such as a CRM application. The request may be indicative of the MESM from which the LESM with be generated from as well as specific objects and attributed to be included in the LESM.

The method is next operative to retrieve 310 the corresponding MESM. In an exemplary embodiment, the MESM may be stored on an application site memory or electronic storage medium. The method may be performed by a hardware based micro processing device, data processing device or equivalent hardware. Optionally, the method may be performed by an algorithm running on a computing device or the like. The MESM may be stored in a local memory or may be retrieved via a network interface. The MESM may be received via a computer communications bus or the like from the local memory.

The method is next operative to generate 315 the LESM in response to a first subset of the MESM and a site mapping data in response to a second subset of the MESM. In an exemplary embodiment, the site mapping data is all of the MESM not included in the first subset of the MESM. In an exemplary embodiment the method may be first operative to translate the MESM to create an interface representation of the MESM in response to the objects, classes and attributes of the MESM. The interface representation of the MESM may then be used to facilitate the conversion process during the MESM to LESM conversion The LESM is then generated in response to the interface representation of the MESM and the MESM data. The LESM may includes a subset of the MESM data where the subset of data is defined by the request and application rules.

The method is next operative to 320 transmit the LESM to the user or requesting client application. The method is then operative to store 325 the site metadata mapping in a local memory or other accessible memory location for future retrieval. The site mapping may include data from the MESM not included as part of the LESM. The site metadata mapping may further be defined in response to the interface representation of the MESM. At this point in the method, the LESM has been provided to the requesting user and external application development and other external data manipulation may occur. External developers may update the LESM with additional attributes and objects as well as updated data. At some point in time, the LESM may be converted back into an updated MESM.

To covert the updated LESM to an updated MESM, the method is next operative to receive 330 a request to regenerate the MESM in response to an LESM received via a client application or the like. In one exemplary embodiment, the LESM is an updated LESM having updated attributes and objects. In an exemplary embodiment, an attribute is a specification for defining a property of an object, element, or file. Examples of attributes may include first name and last name for a object such as a user account. In response to the request to regenerate the MESM, the method is next operative to retrieve 335 a site mapping data associated with the LESM. The site mapping data may be stored on a local memory or another accessible memory.

The method is next operative to regenerate 340 the MESM in response to the retrieved site mapping data and the LESM. The method may further employ the interface representation of the MESM which may be updated from objects and attributes translated from the received updated LESM. The method is next operative to store 345 the MESM in a site data memory or the like. In one exemplary embodiment, the restored MESM is used to replace a previous MESM stored in the site data memory.

Figure 4:
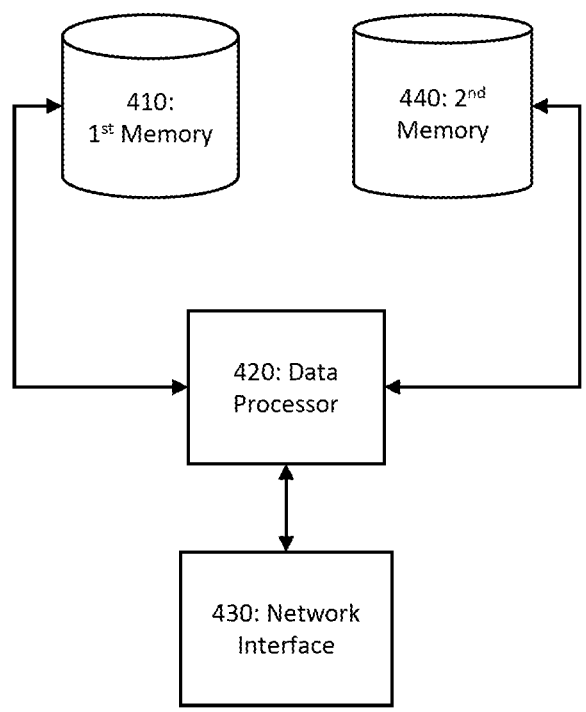
FIG. 4 is block diagram of another exemplary system for expressive conversion of more expressive metadata to less expressive metadata while maintaining lossless conversion according to an exemplary embodiment of the present disclosure.

Turning now to FIG. 4, a block diagram illustrating a system 400 for expressive conversion of more expressive metadata to less expressive metadata while maintaining lossless conversion according to an exemplary embodiment of the present disclosure is shown. The exemplary system 400 may include a first memory 410, a processor 420, a network interface 430 and a second memory 440.

In this exemplary system 400, the first memory 410 may be configured for storing a first system metadata. In an exemplary embodiment, the first system metadata is a more expressive system metadata that may be used by a cloud based customer relationship management application. In this example, the first memory 410 and the first system metadata is accessible to the cloud based application, but is not accessible to the client except through the cloud based application. In this example, the client would not be able to alter classes, objects, or attributes of the first system metadata.

The exemplary system 400 further includes a processor 420, such as a hardware based micro processing device or computer server, for receiving a request for a second system metadata wherein the second system metadata is a subset of the first system metadata, for generating the second system metadata in response to the first system metadata and for generating a site metadata mapping in response to the first system metadata wherein the site metadata mapping includes data from the first system metadata not included in the second system metadata. In this exemplary embodiment, the second system metadata may be a less expressive system metadata which may be transmitted to a client application. In this example, the client application may be operative to change some classes, objects or attributes of the second system metadata.

In an exemplary embodiment, the processor 420 may be operative to generate an updated first system metadata in response to the site metadata mapping and an updated second system metadata. The processor may further be operative to execute a customer relationship management algorithm and wherein the first system metadata includes a customer relationship management data. The processor may be further operative to generate an interface representation of the first system metadata and wherein the second system metadata is generated in response to the interface representation of the first system metadata The system 400 may further include a network interface 430 for transmitting the second system metadata to a client application. The network interface 430 may be a local area network interface, a wireless local area network interface, or an internet connection. The second system metadata may be transmitted to the client application via an intermediate file server or the like. In an exemplary embodiment, the client application may be a local development server operative to alter an object, an attribute and a data of the second system metadata. In an alternate embodiment, the client application may be a customer interface system for publishing. In this example, publishing the second system metadata is an interface for sharing or distributing the second system metadata to authorized users.

The exemplary system 400 may further include a second memory 440 configured for storing the site metadata mapping. The second memory 440 may be operative to the MESM to LESM converter and the LESM to MESM converter and the interface representation of the MESM in order to facilitate the lossless conversion of the LESM to the MESM. In an exemplary embodiment, the site metadata mapping includes classes, objects and/or attributes of the MESM not transmitted to the client application as part of the LESM.

Figure 5:
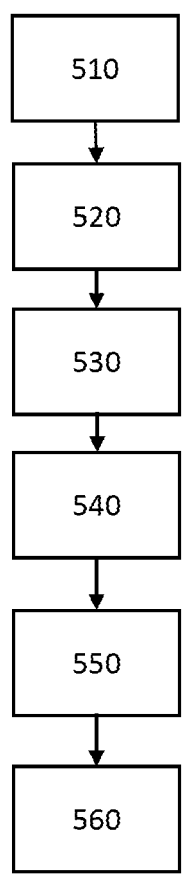
FIG. 5 is a flowchart of another method for expressive conversion of more expressive metadata to less expressive metadata while maintaining lossless conversion according to an exemplary embodiment of the present disclosure.

Turning now to FIG. 5, a flowchart illustrating a method 500 for expressive conversion of more expressive metadata to less expressive metadata while maintaining lossless conversion according to an exemplary embodiment of the present disclosure is shown. The method 500 is first operative for receiving 510 a request for a second system metadata. The request may be generated by a client application, a client interface, or other remote application, or may be generated in response to another algorithm, such as a customer management algorithm or the like.

The method is next operative for retrieving 520 a first system metadata. The first system metadata may be retrieved from a local memory, such as a hard drive or file server, or may be retrieved from a remote location, such as a cloud-based server. In an exemplary embodiment, the first system metadata may be a more expressive system metadata. The first system metadata may be data used by a CRM software. The first system metadata may include objects, classes and attributes of a CRM application.

The method is next operative for generating 530 the second system metadata in response to the request for the second system metadata and the first system metadata wherein the second system metadata includes a first subset of the first system metadata. In an exemplary embodiment, the first metadata may be a more expressive system metadata and the second system metadata may be a less expressive system metadata. For example, the first system metadata may include 100 objects wherein the second system metadata may include only 20 objects where the 20 objects are a subset of the 100 objects. In an exemplary embodiment, the method 500 may be operative to generate an interface representation of the first system metadata and wherein the second system metadata is generated in response to the interface representation of the first system metadata.

The method is next operative for generating 540 a site metadata mapping in response to the second system metadata and the first system metadata wherein the site metadata mapping includes a second subset of the first system metadata not included in the second subset of the first system metadata;

The method is next operative for storing 550 the site metadata mapping in a memory and for transmitting 560 the second system metadata to a client application. The site metadata mapping is preserved in a memory or electronic file storage location to be used for lossless conversion of an updated second system metadata from a client application to an updated first system metadata.

In an exemplary embodiment, the method 500 may be further operative to generate an updated first system metadata in response to the site metadata mapping and an updated second system metadata. The updated second system metadata may be received from a client application which is a local development server operative to alter an object, an attribute and a data of the second system metadata. The method may be performed by a server performing a customer relationship management algorithm and wherein the first system metadata includes a customer relationship management data. The client application is a customer interface system for publishing.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The various tasks performed in connection with process may be performed by software, hardware, firmware, or any combination thereof. For illustrative purposes, the following description of process may refer to elements mentioned above. In practice, portions of process may be performed by different elements of the described system, e.g., component A, component B, or component C. It should be appreciated that process may include any number of additional or alternative tasks, the tasks shown need not be performed in the illustrated order, and process may be incorporated into a more comprehensive procedure or process having additional functionality not described in detail herein. Moreover, one or more of the tasks shown could be omitted from an embodiment of the process as long as the intended overall functionality remains intact.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An apparatus operative as an intermediate interface comprising:
   a memory configured for storing a first system metadata wherein the first system metadata includes a customer relationship management data, and a site metadata mapping;
   a processor configured to execute a customer relationship management algorithm, for receiving a request for a second system metadata wherein the second system metadata is a subset of the first system metadata,
   for generating an interface representation of the first system metadata in response to the first system metadata from the memory,
   for generating the second system metadata in response to the interface representation of the first system metadata,
   for transmitting the second system metadata to a client application, wherein the client application is operative to alter the second system metadata but is unable to alter the first system metadata and the site metadata mapping;
   for generating the site metadata mapping in response to the interface representation of the first system metadata wherein the site metadata mapping includes at least one of an object, a class and an attribute of the first system metadata and data from the first system metadata not included in the second system metadata,
   for receiving an updated second system metadata from the client application,
   for generating an updated interface representation of the first system metadata in response to the updated second system metadata wherein the updated second system metadata includes at least one of an updated attribute, an updated class, and an updated object; and
   for generating an updated first system metadata in response to the updated interface representation of the first system metadata, for replacing the first system metadata in the memory with the updated first system metadata and for performing the customer relationship management algorithm in response to the updated first system metadata; and
   a network interface for transmitting the second system metadata to the client application and for receiving the updated second system metadata from the client application.

2. The apparatus of claim 1 wherein the first system metadata is a more expressive system metadata and the second system metadata is a less expressive system metadata.

3. The apparatus of claim 1 wherein the client application is a local development server operative to alter the object, the attribute and the data of the second system metadata.

4. The apparatus of claim 1 wherein the client application is a customer interface system for publishing.

5. A method performed by an intermediate interface comprising:
   receiving a request for a second system metadata;
   retrieving a first system metadata wherein the first system metadata includes a customer relationship management data;
   generating an interface representation of the first system metadata in response to the first system metadata;
   generating the second system metadata in response to the request for the second system metadata and the interface representation of the first system metadata wherein the second system metadata includes a first subset of the first system metadata;
   generating a site metadata mapping in response to the second system metadata and the interface representation of the first system metadata wherein the site metadata mapping includes at least one of an object, a class and an attribute of the first system metadata and a second subset of the first system metadata not included in the second system metadata;
   storing the site metadata mapping in a memory;
   transmitting the second system metadata to a client application wherein the client application is operative to alter the second system metadata but is unable to alter the first system metadata and the site metadata mapping;

receiving an updated second system metadata from the client application;

generating an updated interface representation of the first system metadata in response to the site metadata mapping and the updated second system metadata wherein the updated second system metadata includes at least one of an updated attributed and an updated object;

generating an updated first system metadata in response to the updated interface representation of the first system metadata;

replacing the first system metadata in the memory with the updated first system metadata; and performing a customer relationship management algorithm in response to the updated first system metadata.

6. The method of claim 5 wherein the first system metadata is a more expressive system metadata and the second system metadata is a less expressive system metadata.

7. The method of claim 5 wherein the client application is a local development server operative to alter the object, the attribute and the class of the second system metadata.

8. The method of claim 5 wherein the client application is a customer interface system for publishing.

9. A method performed by an intermediate interface comprising:

receiving a request for a less expressive system metadata from a client application;

generating an interface representation of a more expressive system metadata;

generating the less expressive system metadata in response to the interface representation of the more expressive system metadata;

generating a site metadata mapping in response to at least one of an object, a class and an attribute of the interface representation of the more expressive system metadata and a subset of the interface representation of the more expressive system metadata not included in the less expressive system metadata;

transmitting the less expressive system metadata to the client application wherein the client application is operative to alter the less expressive metadata but is unable to alter the more expressive metadata and the site metadata mapping;

receiving an updated less expressive system metadata from the client application;

generating an updated interface representation of the more expressive system metadata in response to the updated less expressive system metadata and the site metadata mapping wherein the updated less expressive system metadata includes at least one of an updated attribute and an updated object;

generating an updated more expressive system metadata in response to the updated interface representation of the more expressive system metadata;

replacing the more expressive system metadata with the updated more expressive system metadata; and executing a data management algorithm in response to the updated more expressive system metadata.

10. The method of claim 9 wherein the less expressive system metadata is a subset of the more expressive system metadata.

11. The method of claim 9, wherein the less expressive system metadata is transmitted to the client interface for publishing.

12. The method of claim 9 wherein the updated object and the updated attribute are added by the client application.

* * * * *